(12) United States Patent
Hosoda (10) Patent No.: US 8,982,376 B2
(45) Date of Patent: Mar. 17, 2015

(54) APPENDING A PRINT PASSWORD AND A REPRINT PASSWORD TO A PRINT JOB

(75) Inventor: Yuichi Hosoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/586,944

(22) Filed: Aug. 16, 2012

(65) Prior Publication Data

US 2013/0070280 A1    Mar. 21, 2013

(30) Foreign Application Priority Data

Sep. 20, 2011    (JP) .................................. 2011-205231

(51) Int. Cl.
*G06F 21/60* (2013.01)
*G06K 15/00* (2006.01)
*G06K 15/02* (2006.01)

(52) U.S. Cl.
CPC ........ *G06K 15/1817* (2013.01); *G06K 15/4095* (2013.01); *G06F 21/608* (2013.01)
USPC ......................................... 358/1.14; 358/1.15

(58) Field of Classification Search
USPC ............................................... 358/1.14, 1.15
See application file for complete search history.

(56) References Cited

U.S. PATENT DOCUMENTS

| 6,089,765 | A | * | 7/2000 | Mori | 400/61 |
| 2007/0002338 | A1 | * | 1/2007 | Kim | 358/1.1 |
| 2008/0180747 | A1 | * | 7/2008 | Tsuzuki | 358/1.16 |

FOREIGN PATENT DOCUMENTS

| JP | 2001-063158 A | 3/2001 |
| JP | 2006-218649 A | 8/2006 |
| JP | 2008-183889 A | 8/2008 |
| KR | 10-0657321 B1 | 12/2006 |

* cited by examiner

*Primary Examiner* — Eric A Rust

(74) *Attorney, Agent, or Firm* — Carter, DeLuca, Farrell & Schmidt, LLP (57) ABSTRACT

Print data is always stored securely in printing to prevent printing of the print data by another person in reprinting without being aware by the user of whether to storage it securely. To accomplish this, print data received from a data processing apparatus is stored, and print processing is executed. When reprinting of the stored print data is instructed after printing, input of authentication information for reprinting is requested. When authentication information input in accordance with the request and authentication information of the stored print data coincide with each other, print processing based on the stored print data is executed.

6 Claims, 10 Drawing Sheets

| 601 | 602 | 603 | 604 | 605 | 606 | 607 |
|---|---|---|---|---|---|---|
| JOB ID | JOB OWNER NAME | REPRINT PASSWORD | JOB NAME | JOB SIZE | STORAGE TIME | FINAL PRINT TIME |
| JID001 | CONON TARO | ***** | ASSIGNMENT TABLE | 300KB | 2000/01/23 09:33 | 2000/01/24 14:15 |
| JID002 | TOKYO HANAKO | ***** | SCHEDULE | 1,200KB | 2000/01/23 09:50 | 2000/01/23 09:55 |
| JID003 | CONON TARO | ***** | REPORT | 2,500KB | 2000/01/24 11:10 | 2000/01/24 11:15 |
| ... | ... | ... | ... | ... | ... | ... |

APPENDING A PRINT PASSWORD AND A REPRINT PASSWORD TO A PRINT JOB

BACKGROUND OF THE INVENTION

1. Field of the Invention

The present invention relates to a printing control apparatus which spools a plurality of print data transmitted from a host computer and controls print processing, and a control method therefor.

2. Description of the Related Art

There is a user demand to print one more copy of a given document after printing the given document. To meet this demand, there is known a technique of printing a document in accordance with an instruction to print again (to be referred to as reprint hereinafter) from the operation panel of an image forming apparatus without retransmitting print data from a host computer to the image forming apparatus (for example, Japanese Patent Laid-Open No. 2001-063158).

In normal print processing, an image forming apparatus stores a print job received from the host computer in the internal storage of the image forming apparatus, and after the end of print processing, deletes the stored print job. To the contrary, an image forming apparatus having the above-mentioned reprint function keeps storing received print jobs until the free space of the storage runs out, without deleting stored print jobs even after the end of print processing. The user can reprint a printed image by only inputting a reprint instruction from the operation panel of the image forming apparatus without retransmitting print data from the host computer.

Some image forming apparatuses require user authentication to operate them, and others do not require it. When the reprint function is used in an image forming apparatus which does not perform user authentication, a print job stored in accordance with a print instruction from a given user can be reprinted in accordance with a reprint instruction from a user (another person) different from the given user. Depending on the contents of a reprint instruction, a print job can be reprinted by a plurality of copies. A user may not permit another person to print even a less confidential document.

To prevent printing of a print job by another person without permission when an image forming apparatus operates in the reprint mode, there is proposed a technique of controlling execution of reprinting by user authentication (for example, Japanese Patent Laid-Open No. 2008-183889).

In the technique of Japanese Patent Laid-Open No. 2008-183889, when printing a document stored in a removable medium such as a USB memory, a user is requested to input authentication information, and the input authentication information and raster data generated from the document are stored as a reprint job in an internal memory. Upon receiving an instruction to print the stored reprint job, the user is authenticated according to the authentication information stored in association with the reprint job. Only when the user authentication is successful, reprinting is executed. Before the first printing, this technique prompts the user to determine whether to store a reprint job securely (not to print it by another person without permission). Only when the user instructs to store a reprint job securely, is raster data stored together with authentication information. However, it is required to always store a reprint job securely in printing and prevent printing of the reprint job by another person in reprinting without being aware by the user of whether to store it securely.

SUMMARY OF THE INVENTION

The present invention enables realization of a reprint function which ensures security in printing without being aware by the user of whether to store a reprint job securely.

According to one aspect of the present invention, there is provided a printing control apparatus which causes a printing unit to execute print processing in accordance with print data transmitted from a data processing apparatus, comprising: a reception unit that receives print data from the data processing apparatus; a first printing control unit that causes the printing unit to execute print processing based on the print data received by the reception unit without requesting input of authentication information; a storage unit that stores the print data received by the reception unit; a request unit that requests input of authentication information for reprinting when reprinting of the print data stored in the storage unit is instructed after printing by the first printing control unit; and a second printing control unit that causes the printing unit to execute print processing based on the stored print data when authentication information input in accordance with the request by the request unit and authentication information of the print data stored in the storage unit coincide with each other.

According to another aspect of the present invention, there is provided a control method for controlling a printing control apparatus which causes a printing unit to execute print processing in accordance with print data transmitted from a data processing apparatus, comprising: receiving print data from the data processing apparatus; causing the printing unit to execute print processing based on the print data received in the receiving print data, without requesting input of authentication information; storing the print data received in the receiving print data; requesting input of authentication information for reprinting when reprinting of the print data stored in the storing the print data is instructed after printing in the causing the printing unit to execute print processing; and causing the printing unit to execute print processing based on the stored print data when authentication information input in accordance with the request in the requesting input of authentication information and authentication information of the print data stored in the storing the print data coincide with each other.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
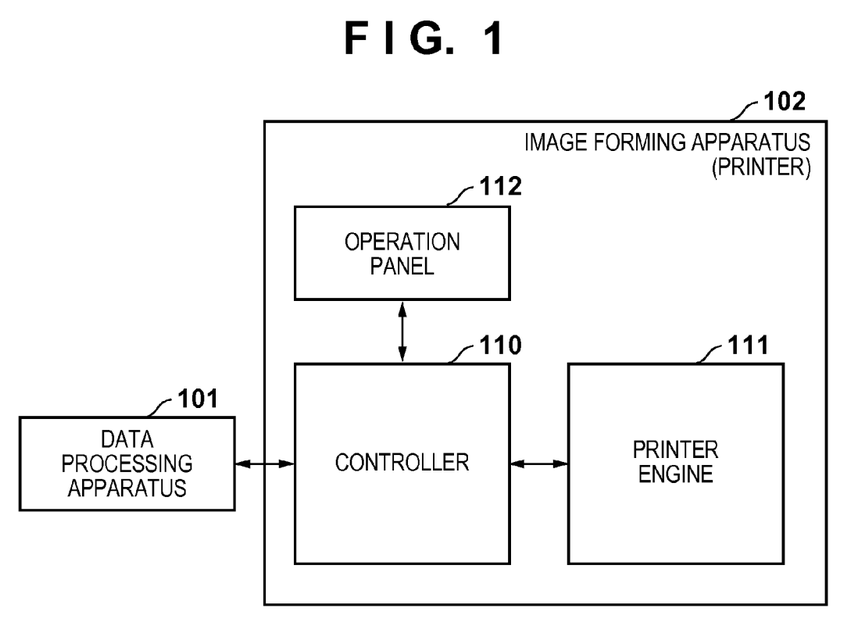
FIG. 1 is a block diagram showing the schematic arrangement of a printing system including an image forming apparatus according to the first embodiment of the present invention.

FIG. 1 is a block diagram showing the schematic arrangement of a printing system including an image forming apparatus (printing apparatus) according to the first embodiment of the present invention.

Referring to FIG. 1, a data processing apparatus 101 is, for example, a host computer, and functions as a supply source for image information (print data) to be formed (printed) by an image forming apparatus 102. The embodiment employs a laser beam printer (to be referred to as a printer hereinafter) as the image forming apparatus 102. The image forming apparatus applied in the embodiment is not limited to the laser beam printer, and may be a printer of another printing method such as an inkjet printer, as a matter of course. A printer controller (to be referred to as a controller hereinafter) 110 generates raster data for each page based on print data (for example, page description language (to be referred to as PDL hereinafter)) supplied from the data processing apparatus 101, and sends the raster data to a printer engine 111. The printer engine 111 forms a latent image on a photosensitive drum based on the raster data supplied from the controller 110, transfers the latent image onto a printing medium (sheet), and fixes it (electrophotographic method), thereby forming (printing) the image. An operation panel 112 is used as a user interface. The controller 110 accepts a desired operation instruction from the user via the operation panel 112. The controller 110 displays the processing contents of the printer 102 and a warning to the user via the operation panel 112.

Figure 2:
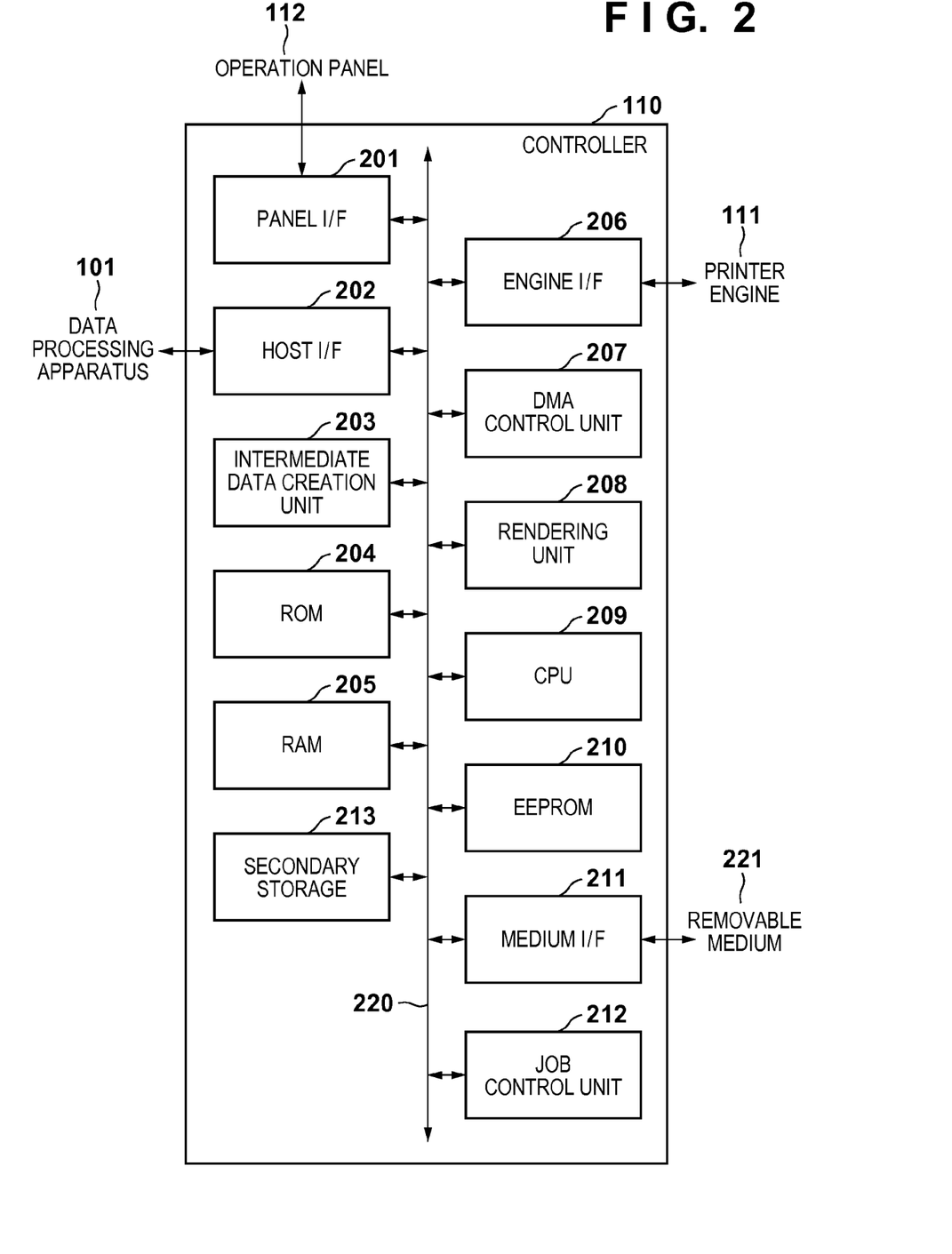
FIG. 2 is a block diagram exemplifying the arrangement of a controller according to the first embodiment.

FIG. 2 is a block diagram exemplifying the arrangement of the controller 110 according to the first embodiment.

A panel interface 201 controls exchange of data between the controller 110 and the operation panel 112. A CPU 209 accepts, via the panel interface 201, various settings and instruction contents which have been input by the user using the operation panel 112. A host interface 202 communicates with the data processing apparatus 101 such as a host computer in two ways via a network. An intermediate data creation unit 203 converts a print job, which has been received from the data processing apparatus 101 via the host interface 202, into intermediate data of a format which can be easily handled in the printer 102. A ROM 204 holds control program codes for executing processing by the CPU 209 according to the first embodiment. A RAM 205 functions as the main memory of the CPU 209, and provides a work memory area for temporarily storing various data. Data stored in the RAM 205 by the CPU 209 include print data received via the host interface 202, intermediate data generated by interpreting print data, and bitmap data generated by rendering intermediate data. Further, there are various processing statuses necessary for other processes.

A secondary storage 213 stores print data received via the host interface 202, log information, and the like. The secondary storage 213 includes an HDD and SD card. An engine interface 206 connects the controller 110 and printer engine 111. The CPU 209 recognizes the state of the printer engine 111 via the engine interface 206. A DMA control unit 207 is used to transfer bitmap data stored in the RAM 205 to the printer engine 111 or the like by DMA. A rendering unit 208 rasterizes intermediate data stored in the RAM 205 into bitmap data, and stores the bitmap data in the RAM 205. The CPU 209 controls devices connected to a CPU bus 220 based on control program codes stored in the ROM 204. An EEPROM 210 is a nonvolatile memory for holding setting information of the printer 102. A medium interface 211 reads out various data such as image data, program data, and device setting data from a removable medium 221 such as a USB memory, and writes data on the medium 221. A job control unit 212 is a module for a program held in the ROM 204. The program is stored in the RAM 205 of the controller 110 in execution, and is executed by the CPU 209. The CPU 209 stores data received from the data processing apparatus 101 as a print job in the RAM 205 or secondary storage 213, and executes print processing via the job control unit 212. Further, the CPU 209 stores data received from the data processing apparatus 101 as a print job in the RAM 205 or secondary storage 213, and deletes a print job stored in the secondary storage 213 or the like from it via the job control unit 212. The CPU bus 220 is a system bus including address, data, and control buses, and connects the respective units 201 to 210 and the CPU 209.

Figure 3:
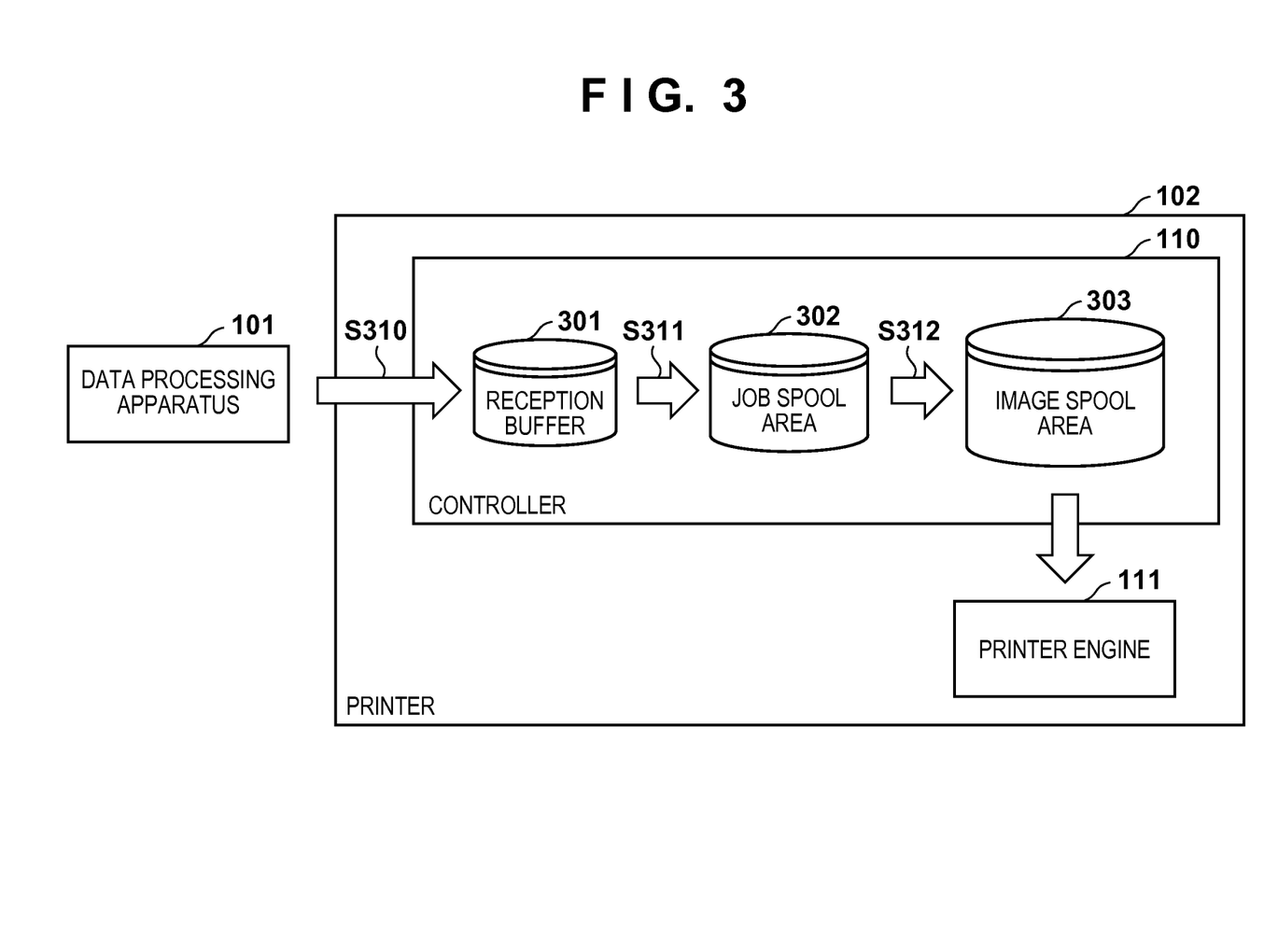
FIG. 3 is a view for explaining a data flow in the controller according to the embodiment.

FIG. 3 is a view for explaining a data flow in the controller 110 according to the first embodiment.

A reception buffer 301 is logically ensured in the RAM 205, and stores print data received from the data processing apparatus 101. A job spool area 302 is logically ensured in the RAM 205 or secondary storage 213. The capacity of the reception buffer 301 is generally smaller than that of the job spool area 302. An image spool area 303 is logically ensured in the RAM 205.

In step S310, if the reception buffer 301 is free, the host interface 202 receives print data from the data processing apparatus 101, and stores it in the reception buffer 301. Upon receiving a notification that the print data has been stored in the reception buffer 301, the job control unit 212 determines whether the job spool area 302 has a free space of the same size as the amount of data in the reception buffer 301. In step S311, if the job spool area 302 does not have a free space of the same size, the job control unit 212 waits until a free space of the same size is ensured. If the job spool area 302 has a free space of the same size, the job control unit 212 stores the print data as a print job in the job spool area 302. Then, data in the reception buffer 301 is deleted, freeing the reception buffer 301. The job control unit 212 also asynchronously performs processing of deleting a print job stored in the job spool area 302.

On condition that the image spool area 303 has a free space of a predetermined size, the intermediate data creation unit 203 reads out a print job stored in the job spool area 302, and performs PDL interpretation processing (intermediate data generation processing). Intermediate data generated by the intermediate data creation unit 203 is stored in a buffer (not shown) which is logically ensured in the RAM 205. The rendering unit 208 executes rendering processing according to intermediate data stored in the buffer (not shown), and stores bitmap data generated by the rendering processing in the image spool area 303 (step S312). In synchronism with the printer engine 111, the engine interface 206 transfers the bitmap data in the image spool area 303 to the printer engine 111 to print it under the control of the DMA control unit 207 (step S313).

The printer 102 according to the first embodiment includes a normal print (first printing control) mode in which the printer 102 receives print data from the data processing apparatus 101 and prints it, and a reprint (second printing control) mode in which the printer 102 reprints a print job stored in the job spool area 302. The printer 102 can switch between the reprint mode and the normal print mode in accordance with a setting on the user menu of the main body.

The reprint mode is a re-printing mode in which a printed print job remains stored in the job spool area 302, and after printing in the normal print mode, the stored print job is printed again in accordance with a print instruction from the user. When the reprint mode is set, the controller 110 controls, via the job control unit 212, to keep a print job stored in the job spool area 302 without deleting it even after the end of the print job. When the reprint mode is set, the job control unit 212 manages a stored print job in accordance with a stored job management table to be described later with reference to FIG. 6.

The controller 110 displays print jobs stored in the job spool area 302 as a reprintable job list on the operation panel 112 via the panel interface 201. The display screen of the operation panel 112 that represents a reprintable job list will be described with reference to FIGS. 7A to 7E.

If the user issues a reprint instruction via the operation panel 112 for a reprintable job list displayed on the operation panel 112, the controller 110 executes the instructed print job to print.

Figure 4A:
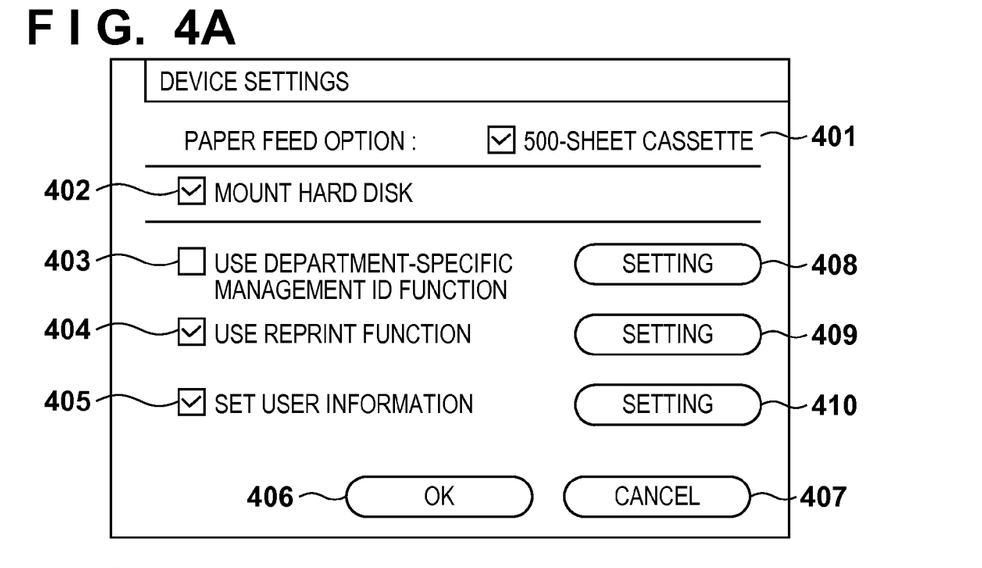
FIGS. 4A to 4C are views each exemplifying a UI screen displayed by a printer driver running on a data processing apparatus according to the first embodiment.
Figure 4B:
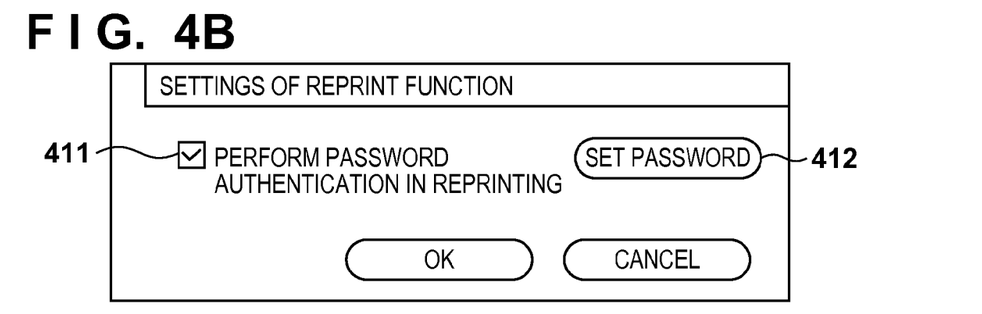
Figure 4C:
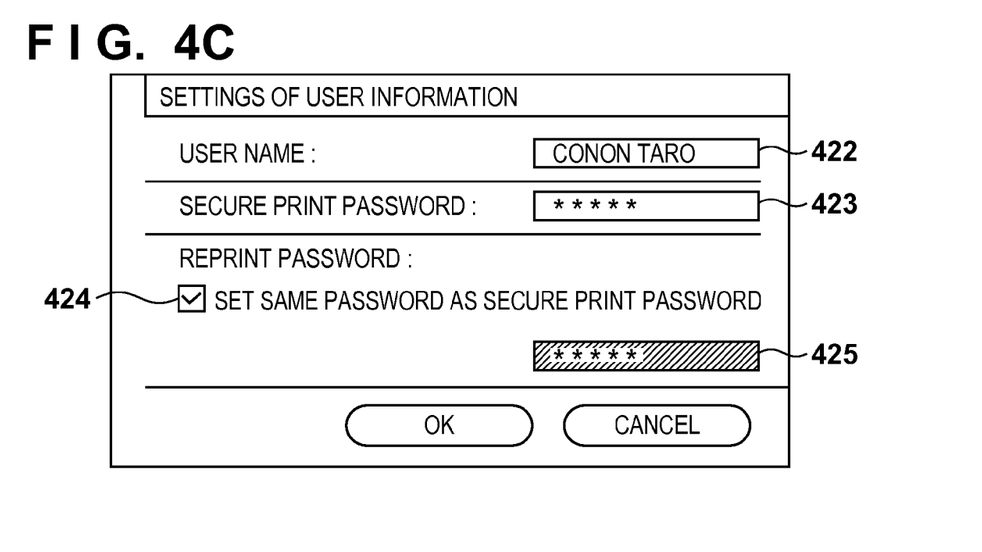

FIGS. 4A to 4C are views each exemplifying a UI screen displayed by a printer driver running on the data processing apparatus 101 according to the first embodiment. The printer driver is software running on the data processing apparatus 101 to transmit a print job to the printer 102.

FIG. 4A shows a screen for setting the printer driver by the user in accordance with the settings of the printer 102.

A check box 401 is used to set the mounting state of a 500-sheet cassette serving as a paper feed option. A check in the check box 401 means that the 500-sheet cassette serving as a paper feed option has been mounted. A check box 402 is used to set the mounting state of an optional hard disk. A check in the check box 402 means that a hard disk has been mounted. A check box 403 is used to, when the printer 102 is set in a department-specific management mode, print within operations in this mode. An advanced setting button 408 is used to make advanced settings of the department-specific management ID function. A check box 404 is used to use the reprint function when the printer 102 is set in the above-described reprint mode. An advanced setting button 409 is used to make advanced settings of the reprint function. When the user presses the button 409, the printer driver displays an advanced setting screen in FIG. 4B.

A check box 405 is used to set user information when using the printer 102. An advanced setting button 410 is used to set detailed information of the user information. When the user presses the button 410, the printer driver displays an advanced setting screen in FIG. 4C. Note that the printer driver controls display to permit button operations to the advanced setting buttons 408, 409, and 410 in accordance with the check states of the check boxes 403, 404, and 405. An OK button 406 is used to enable settings on the screen. A cancel button 407 is used to cancel settings on the screen. Note that operations when the OK button and cancel button are pressed also apply to the screens in FIGS. 4B and 4C.

FIG. 4B shows a screen used to make advanced settings of the reprint function by the user. The screen in FIG. 4B appears when the user presses the advanced setting button 409 in FIG. 4A.

A check box 411 is used to set whether to perform password-based authentication when the user instructs reprinting. A button 412 is used to set a reprint password. When the user presses the button 412, the printer driver displays a setting screen in FIG. 4C.

FIG. 4C shows a screen used to set user information for reprinting. The screen in FIG. 4C appears when the user presses the advanced setting button 410 in FIG. 4A or presses the password setting button 412 in FIG. 4B.

A text box 422 is used to enter a user name. The printer driver holds a character string in the text box 422 as job owner name information in the internal memory, and when creating print data, adds the job owner name information held in the internal memory to the print job. A text box 423 is used to enter a secure print password. The printer driver holds a character string in the text box 423 as a secure print password in the internal memory. The text box 423 displays a fixed character string regardless of character information entered by the user. Only when creating print data upon receiving a secure print instruction, the secure print password held in the internal memory is added to a print job. A check box 424 is used to set whether to make the reprint password identical to the secure print password. A text box 425 is used when the check box 424 is not checked, that is, used to enter a reprint password different from the secure print password. The printer driver controls display to permit input to the text box 425 only when the check box 424 is not checked. When the check box 424 is checked, the printer driver holds the secure print password held in the internal memory as a reprint password in the internal memory. When the check box 424 is not checked, the printer driver holds a character string entered to the text box 425 as a reprint password in the internal memory. The text box 425 displays a fixed character string regardless of character information entered by the user. When creating print data, if the check box 404 is checked and it is set to use the reprint function, the printer driver adds the reprint password held in the internal memory to a print job.

Figure 5A:
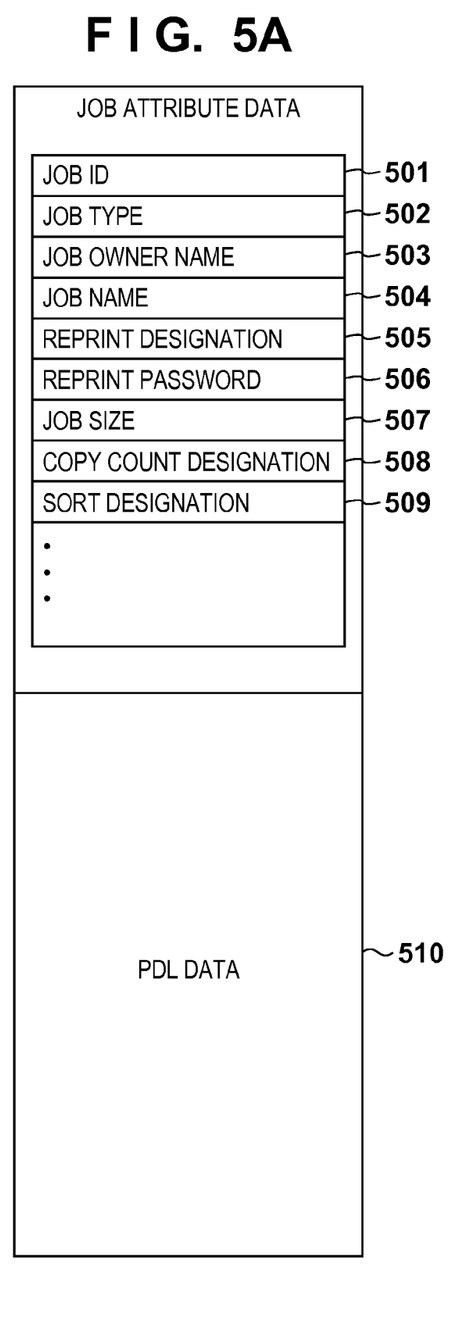
FIGS. 5A and 5B are views each showing the data structure of a print job generated by the printer driver running on the data processing apparatus according to the first embodiment.
Figure 5B:
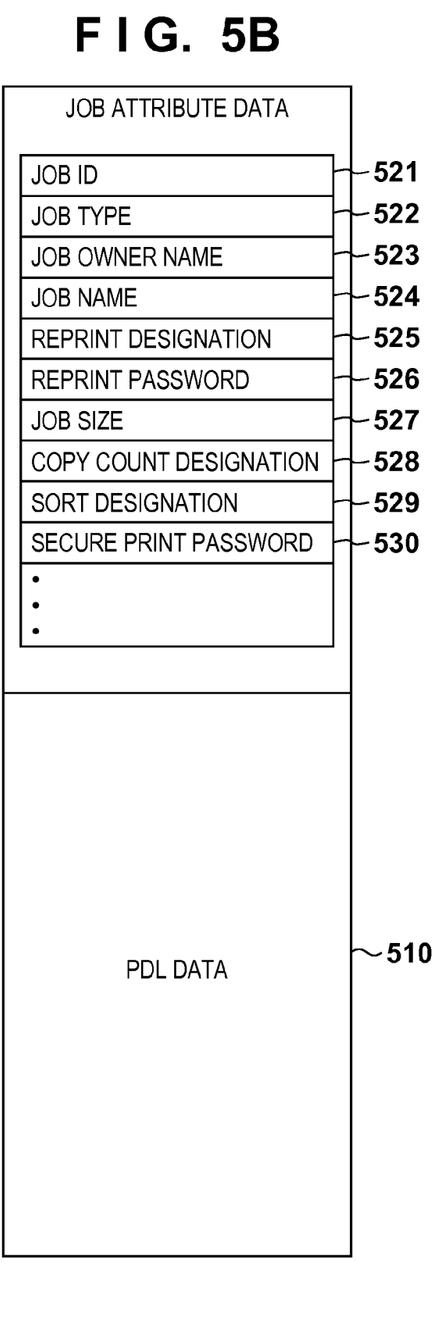

FIGS. 5A and 5B are views each showing the data structure of a print job generated by the printer driver running on the data processing apparatus 101 according to the first embodiment.

FIG. 5A is a view showing the data structure of a normal print job. Job attribute data is formed from attribute data such as attributes 501 to 509. Reference numeral 510 denotes PDL data. The job ID attribute 501 is used to discriminate a job. The job type attribute 502 is used to discriminate a job type such as a print job or secure print job. For a normal print job, the printer driver sets a print job ID in the job type attribute 502. As the job owner name attribute 503, for example, job owner name information which has been entered to the text box 422 shown in FIG. 4C and is held in the internal memory is set. As the job name attribute 504, for example, the file name of print data is set. The reprint designation 505 is set in accordance with the state of the check box 404 in FIG. 4A. For example, if the check box 404 in FIG. 4A is checked, "ON" is set in the reprint designation 505 as a job to be reprinted. If the check box 404 in FIG. 4A is not checked, "OFF" is set in the reprint designation 505. The reprint password attribute 506 is used in reprinting. As the reprint password attribute 506, for example, a reprint password (re-printing password) which has been entered to the check box 424 or text box 425 in FIG.

4C and is held in the internal memory is set. The job size attribute 507 represents the data size of the PDL data 510. The copy count designation attribute 508 is used to repetitively output the PDL data 510. The sort designation attribute 509 is used to sort and output the PDL data.

FIG. 5B is a view showing the data structure of a secure print job. A difference from FIG. 5A is that a job type attribute 522 is set as a secure print job and a secure print attribute 530 is added. As the secure print attribute 530, for example, a secure print password which has been entered to the text box 423 in FIG. 4C and is held in the internal memory is set. Remaining attributes 521 and 523 to 529 are the same as the attributes 501 and 503 to 509 of the job attribute data in FIG. 5A, and a description thereof will not be repeated.

Figure 6:
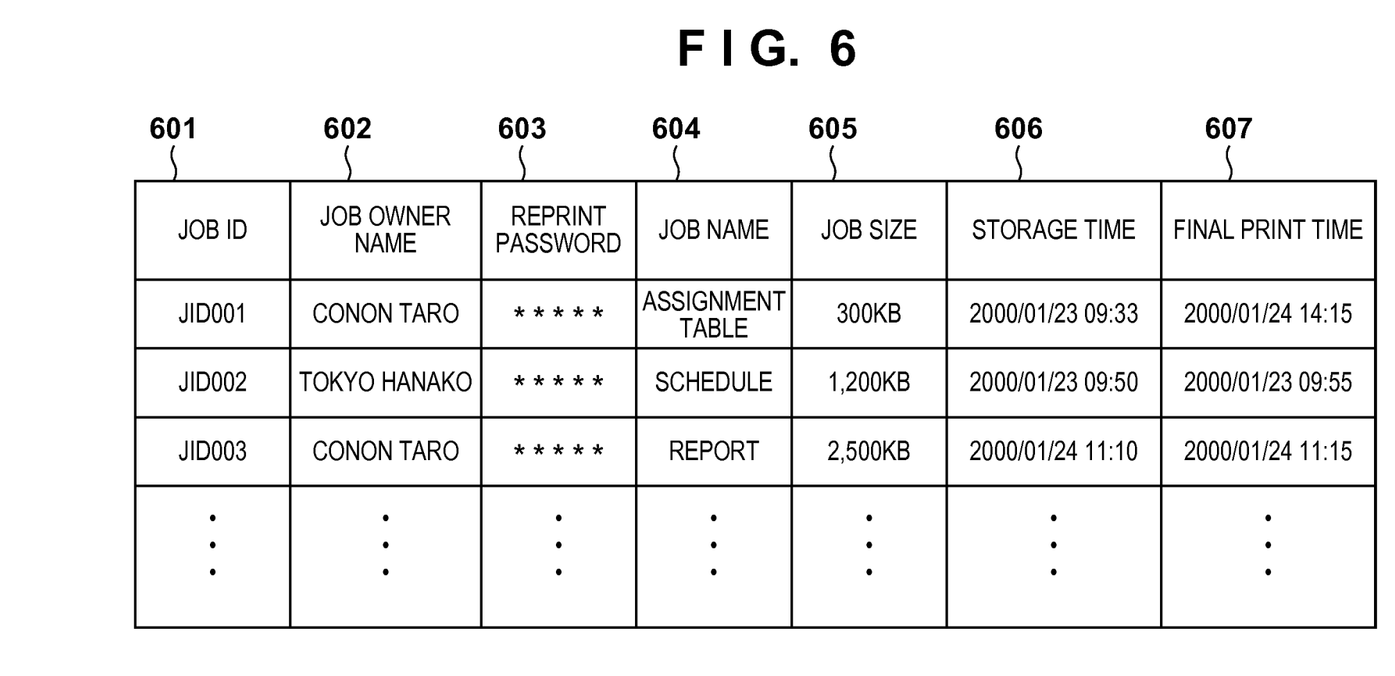
FIG. 6 is a table exemplifying a stored job management table managed by a job control unit according to the first embodiment.

FIG. 6 is a table exemplifying a stored job management table managed by the job control unit 212 of the printer 102 according to the first embodiment.

The stored job management table is used when the job control unit 212 manages all print jobs stored in the job spool area 302. The stored job management table is stored in a management area in the job spool area 302. When transferring print data stored in the reception buffer 301 to the job spool area 302, the job control unit 212 determines whether the transferred print data is data of a new job. If the job control unit 212 determines that the print job is a new job, it interprets job attribute data (for example, job attribute data in FIG. 5A) of the print job. The job control unit 212 extracts, from the print data, information including a job ID 601, job owner name 602, reprint password 603, job name 604, and job size 605, and newly registers it in the stored job management table.

When the reprint designation (for example, the reprint designation 505 in FIG. 5A) of the job attribute data is "ON", the job control unit 212 registers the reprint password 506 of the job attribute data in the reprint password 603. If the reprint designation 505 is "OFF", the job control unit 212 registers, in the reprint password 603, a value representing that the job does not have a reprint password.

At the same time as registration of job attribute data, the job control unit 212 registers, as storage time information 606 of a target job, the time when the target job was stored as a new job. Further, the job control unit 212 registers or updates a final print time 607 of the target job in accordance with a printing end notification from the engine interface 206.

FIGS. 7A to 7E are views each exemplifying a UI screen for accepting a reprint instruction by the panel interface 201 according to the first embodiment.

Figure 7A:
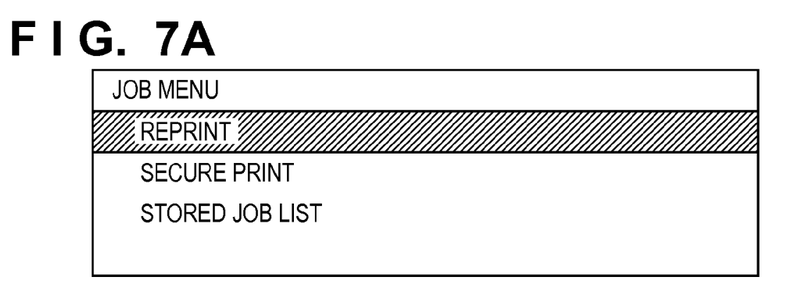
FIGS. 7A to 7E are views each exemplifying a UI screen for accepting a reprint instruction by a panel interface according to the first embodiment.

FIG. 7A is a view exemplifying a job menu screen for operating a job stored in the job spool area 302. If the user selects "reprint" on the job menu screen via the operation panel 112, the panel interface 201 displays a UI screen in FIG. 7B in accordance with job owner information in the stored job management table via the job control unit 212. If the printer 102 is not set in the reprint mode, a menu item "reprint" for instructing reprinting is not displayed on the menu screen, and none of screens shown in FIGS. 7B to 7E is displayed.

Figure 7B:
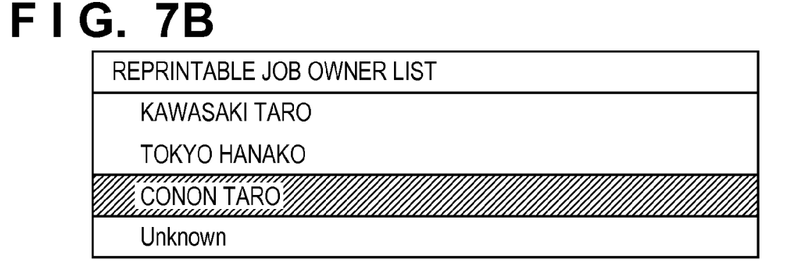

FIG. 7B is a view exemplifying a screen which displays an owner list of reprintable print jobs. By using this screen, the user selects the owner name of a print job to be reprinted. For example, if the user selects "Conon Taro" on this screen via the operation panel 112, the panel interface 201 displays a screen in FIG. 7C in accordance with job information corresponding to the owner name "Conon Taro" via the job control unit 212.

Figure 7C:
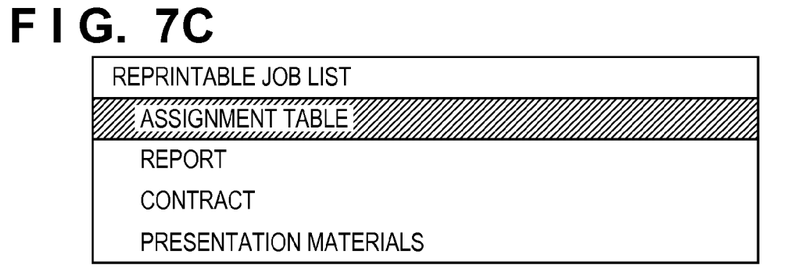

FIG. 7C exemplifies a screen which displays a list of reprintable print jobs corresponding to the job owner "Conon Taro". On this screen, the user can designate a print job he wants to reprint. For example, if the user selects "assignment table" on this screen via the operation panel 112, the panel interface 201 acquires job ID information (JID001 (FIG. 6)) corresponding to the job name "assignment table" via the job control unit 212, and displays a screen in FIG. 7D.

Figure 7D:
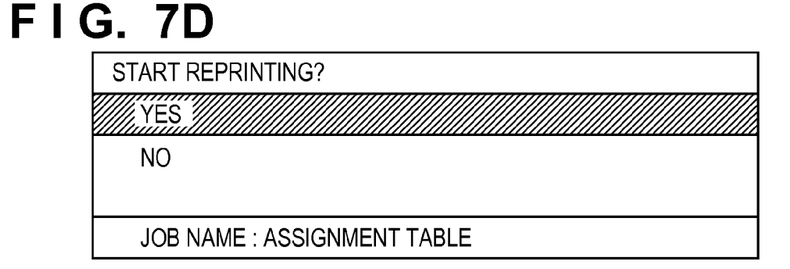

FIG. 7D is a view exemplifying a screen for instructing the start of reprinting. If the user selects "YES" on this screen via the operation panel 112, the panel interface 201 displays a screen in FIG. 7E to perform user authentication for the job ID "JID001".

Figure 7E:
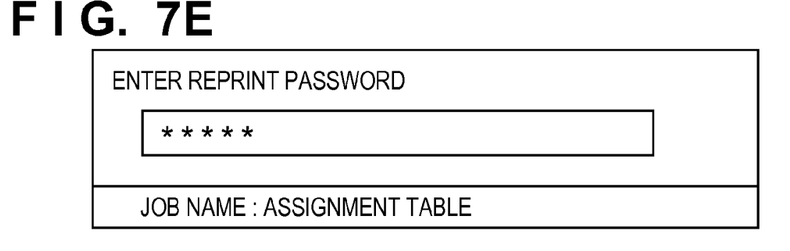

FIG. 7E shows a screen for performing user authentication in accordance with the reprint password of the job ID "JID001". For example, the user enters a reprint password on the screen via the operation panel 112. Then, the job control unit 212 compares the entered password with the reprint password of the job ID "JID001" that is stored in the stored job management table of FIG. 6. If these passwords coincide with each other as a result of the comparison, the job control unit 212 instructs reprinting for the job ID "JID001". If these passwords do not coincide with each other, the job control unit 212 notifies the panel interface 201 to interrupt reprinting. The panel interface 201 displays, on the operation panel 112, a message that reprinting is impossible because of inconsistency of the passwords. The screen in FIG. 7E then returns to one in FIG. 7C.

Figure 8:
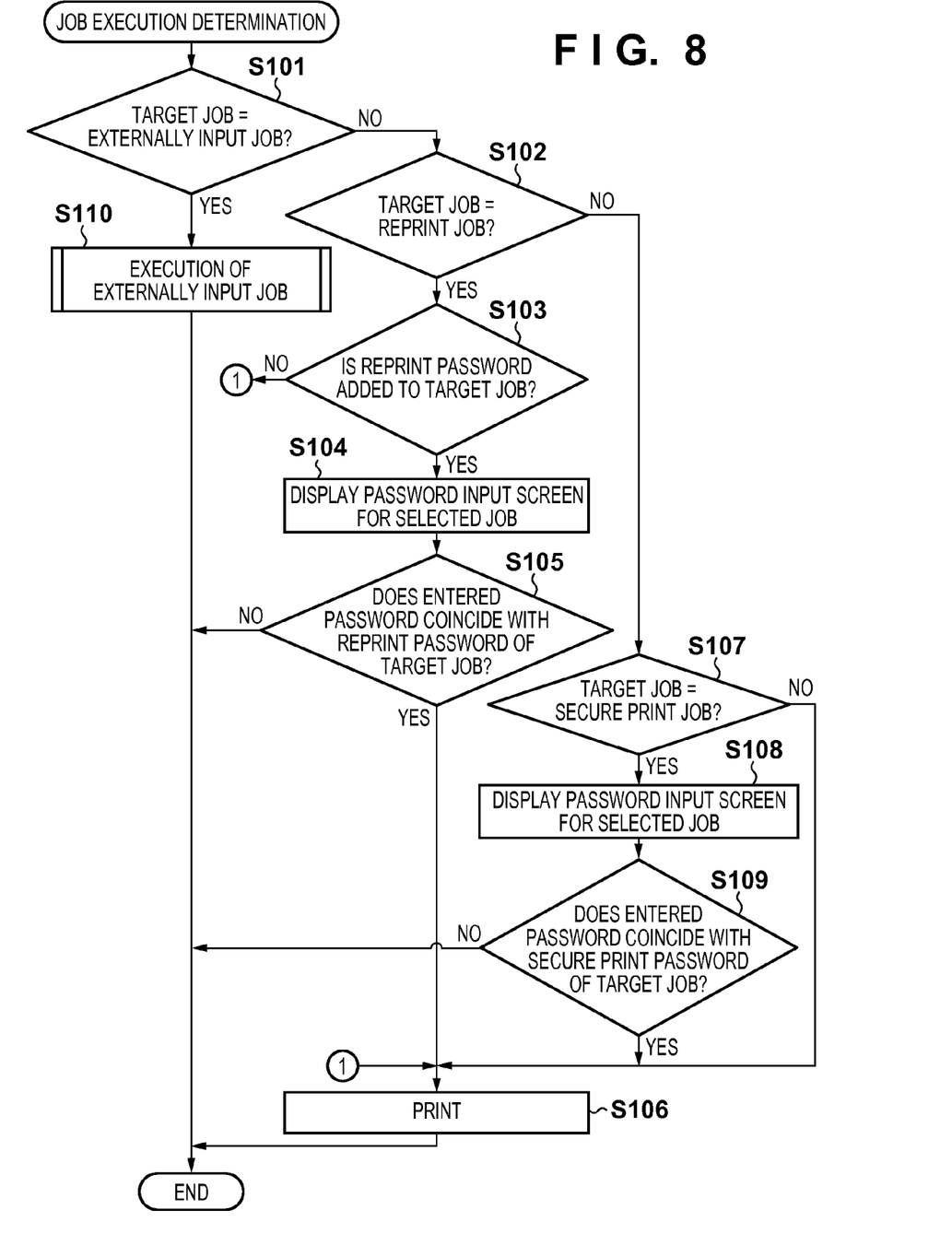
FIG. 8 is a flowchart showing a processing sequence when a job control unit determines whether to execute a target job in accordance with a job execution trigger according to the first embodiment.

FIG. 8 is a flowchart showing a processing sequence when the job control unit 212 determines whether to execute a target job in accordance with a job execution trigger according to the first embodiment. A program for executing processing represented by this flowchart is stored in the RAM 205 and executed under the control of the CPU 209.

In step S101, the job control unit 212 determines whether a job to be executed is a print job input from an external apparatus such as the data processing apparatus 101. If the job control unit 212 determines in step S101 that the target job is a print job input from an external apparatus, the process advances to step S110, and the job control unit 212 instructs execution of predetermined processing based on the externally input job. For example, the job control unit 212 interprets print job data input from the host interface 202, stores it in the job spool area 302, and reads out PDL data stored in the job spool area 302. When the controller 110 is set in the reprint mode, the job control unit 212 stores all input jobs in the job spool area 302. After that, the job control unit 212 instructs the intermediate data creation unit 203 to convert the PDL data into intermediate data. After the end of the conversion, the job control unit 212 instructs the rendering unit 208 to convert the intermediate data into bitmap data. Finally, the job control unit 212 instructs the engine interface 206 and DMA control unit 207 to transfer the bitmap data to the printer engine 111.

If the job control unit 212 determines in step S101 that the job to be executed is not a print job input from an external apparatus, the process advances to step S102, and the job control unit 212 determines whether the target job is a reprint job or secure print job. If the job control unit 212 determines in step S102 that the target job is a reprint job, the process advances to step S103, and the job control unit 212 determines, based on the reprint password 603 of the stored job management table shown in FIG. 6, whether a reprint password is set for the target job. If the job control unit 212 determines in step S103 that the reprint password is set, the process advances to step S104; if NO, to step S106.

In step S104, the job control unit 212 determines that user authentication is necessary because the reprint password is added to the target job. Then, the job control unit 212 displays, for example, the screen of FIG. 7E on the operation panel 112 via the panel interface 201. The process advances to step S105, and the job control unit 212 acquires, via the panel interface 201, a password entered by the user. The job control unit 212 compares the acquired password with the reprint password of the target job that is stored in the stored job management table of FIG. 6, and determines whether these passwords coincide with each other. If the job control unit 212 determines in step S105 that these passwords coincide with each other, the process advances to step S106, and the job control unit 212 executes the reprint job.

In step S106, as print processing for the reprint job, the job control unit 212 reads out PDL data stored in the job spool area 302. The job control unit 212 instructs the intermediate data creation unit 203 to convert the PDL data into intermediate data. After the end of the conversion, the job control unit 212 instructs the rendering unit 208 to convert the intermediate data into bitmap data. Finally, the job control unit 212 instructs the engine interface 206 and DMA control unit 207 to transfer the bitmap data to the printer engine 111.

If the job control unit 212 determines in step S105 that these passwords do not coincide with each other, it ends the job execution determination processing and waits for the next job execution instruction.

If the job control unit 212 determines in step S102 that the target job is not a reprint job, the process advances to step S107, and the job control unit 212 determines whether the target job is a secure print job. If the job control unit 212 determines that the target job is a secure print job, the process advances to step S108, and the job control unit 212 displays a secure print password input screen (not shown) on the operation panel 112 via the panel interface 201. Thereafter, the process advances to step S109, and the job control unit 212 acquires, via the panel interface 201, a password entered by the user. The job control unit 212 compares the acquired password with the secure print password of the target job that is stored in the RAM 205, and determines whether these passwords coincide with each other. If the job control unit 212 determines in step S109 that these passwords coincide with each other, the process advances to step S106, and the job control unit 212 executes print processing for the secure print job. If the job control unit 212 determines in step S109 that these passwords do not coincide with each other, it ends the job execution determination processing and waits for the next job execution instruction.

If the job control unit 212 determines in step S107 that the target job is not a secure print job, the process advances to step S106, and the job control unit 212 executes print processing as a print job for a stored job and ends the job execution determination processing.

By this processing, an externally received print job is printed first regardless of the presence/absence of reprint designation. If reprinting is designated, the print job is stored in the job spool area 302. At this time, the stored job management table in FIG. 6 is also updated. If reprinting of the stored print job is instructed after printing, input of a reprint password for the stored job is requested. If a user name and password (authentication information) entered by the user in response to the request coincide with stored ones, the selected print job is printed again. Similarly, for a secure print job, when stored print job authentication information coincides with authentication information entered by the user, the selected secure print job is printed.

A processing sequence by the job control unit 212 when the printer 102 is set in the reprint mode will be explained.

Figure 9:
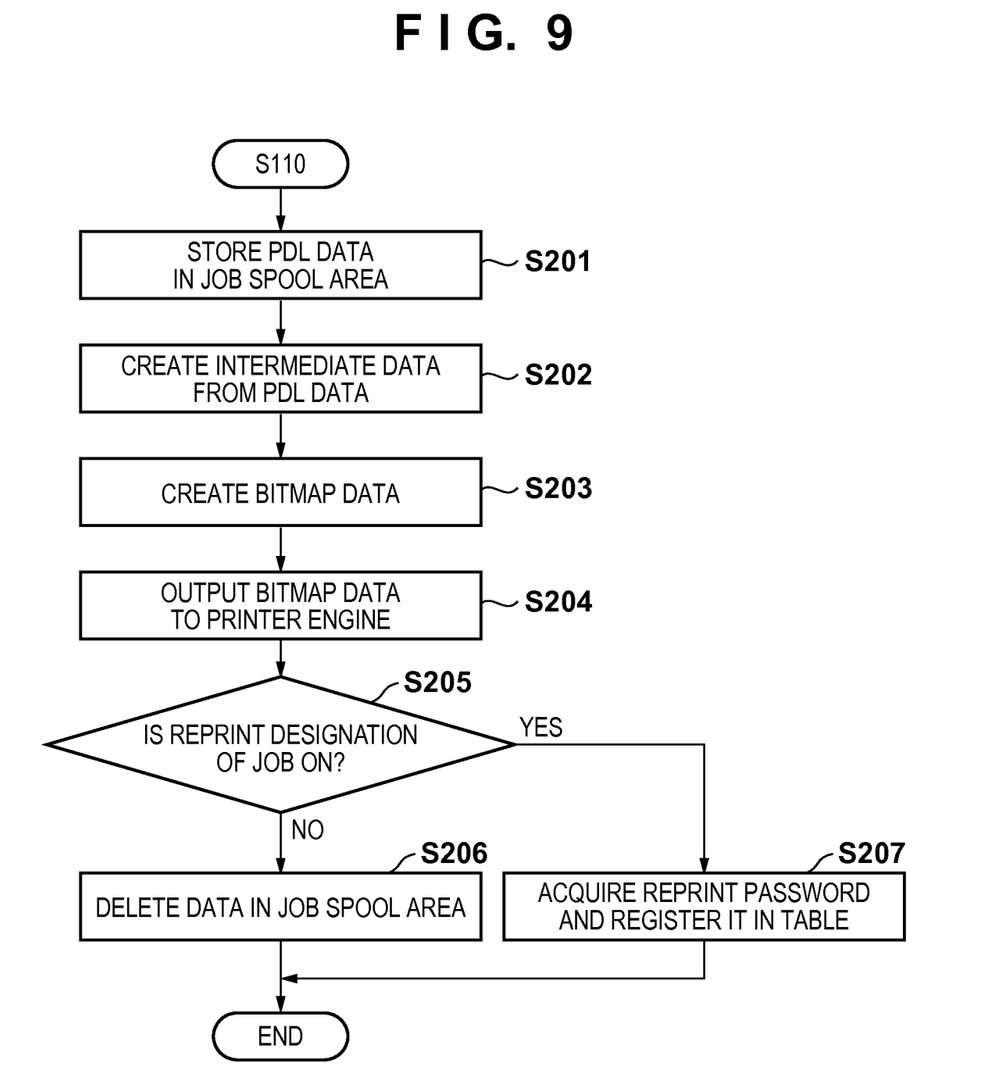
FIG. 9 is a flowchart for explaining processing (step S110) to execute an externally input job when a printer is set in a reprint mode according to the first embodiment.

FIG. 9 is a flowchart for explaining processing (step S110) to execute an externally input job when the printer 102 is set in the reprint mode according to the first embodiment. A program for executing processing represented by this flowchart is stored in the RAM 205 and executed under the control of the CPU 209.

In step S201, the job control unit 212 interprets print job data input from the host interface 202, and stores it in the job spool area 302. At this time, the job control unit 212 registers part of job attribute data out of the input print data in the stored job management table (FIG. 6) in the job spool area 302, and stores PDL data in another area of the job spool area 302. The process advances to step S202, and the job control unit 212 stores the PDL data by a predetermined size in the job spool area 302, and then starts reading out the stored PDL data. After that, the job control unit 212 instructs the intermediate data creation unit 203 to convert the PDL data into intermediate data. After the end of the conversion, in step S203, the job control unit 212 instructs the rendering unit 208 to convert the intermediate data into bitmap data. The process advances to step S204, and the job control unit 212 instructs the engine interface 206 and DMA control unit 207 to transfer the bitmap data to the printer engine 111. The process advances to step S205, and the job control unit 212 determines whether reprint designation of the input job is ON. If the reprint designation is ON, the process advances to step S207, and the job control unit 212 acquires a reprint password contained in the attribute data of the print job, registers it in the reprint password of a corresponding job in the stored job management table, and ends the processing. If the reprint designation is OFF in step S205, the process advances to step S206, and the job control unit 212 deletes the PDL data which has been stored in the job spool area 302 in step S201, and ends the processing.

Next, print processing (reprint processing) upon accepting a reprint instruction will be described.

Figure 10:
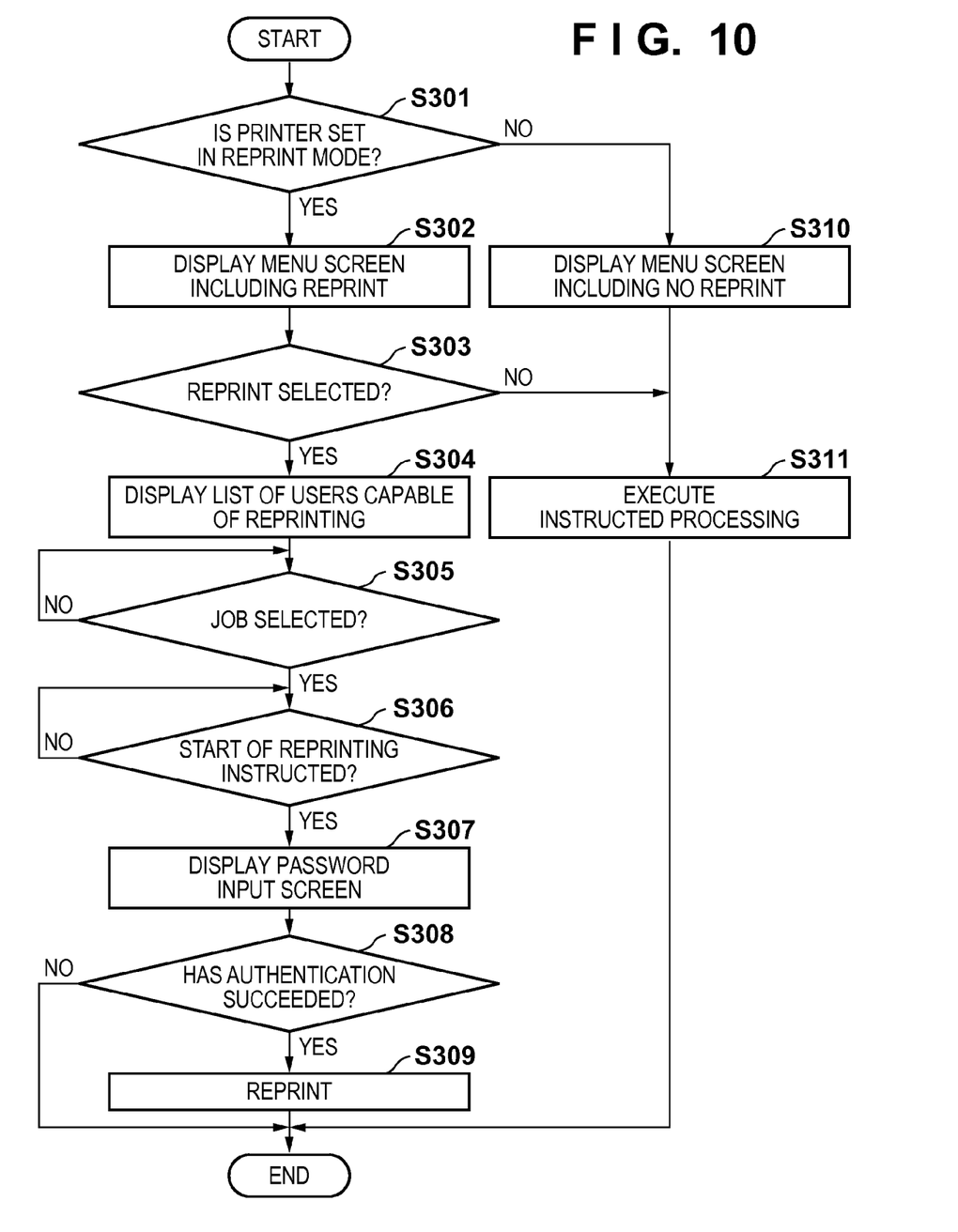
FIG. 10 is a flowchart for explaining print processing when a printer 102 accepts a reprint instruction according to the first embodiment.

FIG. 10 is a flowchart for explaining print processing when the printer 102 accepts a reprint instruction according to the first embodiment. A program for executing processing represented by this flowchart is stored in the RAM 205 and executed under the control of the CPU 209.

In step S301, it is determined whether the printer 102 is set in the reprint mode before displaying the menu screen shown in FIG. 7A. If the printer 102 is set in the reprint mode, the process advances to step S302 to display the menu screen shown in FIG. 7A. If the user selects "reprint" on the menu screen in step S303, the process advances to step S304 to display a list of users capable of reprinting as shown in FIG. 7B. If the user selects a print job to be reprinted from a reprintable job list (FIG. 7C) corresponding to the selected user in step S305, the process advances to step S306. If the user instructs the start of reprinting on the screen shown in FIG. 7D in step S306, the process advances to step S307 to display a password input screen as shown in FIG. 7E. In step S308, it is determined whether a password entered on the screen of FIG. 7E coincides with the reprint password of a corresponding job that is registered in the stored job management table of FIG. 6. If the passwords coincide with each other and the authentication has succeeded, the process advances to step S309 to reprint the designated job. If the authentication has failed in step S308, the process ends.

In the processing of step S309, as print processing for the reprint job, the job control unit 212 reads out PDL data stored in the job spool area 302. The job control unit 212 instructs the intermediate data creation unit 203 to convert the PDL data into intermediate data. After the end of the conversion, the job control unit 212 instructs the rendering unit 208 to convert the intermediate data into bitmap data. Finally, the job control unit 212 instructs the engine interface 206 and DMA control unit 207 to transfer the bitmap data to the printer engine 111, and executes reprinting.

If the printer 102 is not set in the reprint mode in step S301, the process advances to step S310 to display a menu screen including no "reprint" in FIG. 7A, and to step S311 to execute processing designated on the menu screen. If the user does not select "reprint" in step S303, the process also advances to step S311 to execute instructed processing.

As described above, according to the first embodiment, when a reprint instruction is accepted, user authentication is always executed. Only when the user authentication is successful, reprinting is executed. A user who uses a printer set in the reprint mode can print without bothering about whether his document or the like may be reprinted by another person.

The user suffices to set a reprint password on the printer driver in the first printing. In subsequent printing, the user can use the reprint function based on user authentication by only entering the reprint password. Even a printer which is not in a complete user authentication environment by an authentication card or the like can provide the reprint function which ensures minimum security.

Second Embodiment

In the first embodiment, when printing a print job received from the data processing apparatus 101, the received print data (PDL data) is temporarily stored in the job spool area 302. When reading out and printing the PDL data, it is printed without performing password-based user authentication. When reprinting a print job stored in the job spool area 302 for reprinting, password-based user authentication is performed and then the print job is reprinted. To the contrary, in the second embodiment, reprinting is executed not by an image forming apparatus 102 itself but by another image forming apparatus such as another printer or multi-function peripheral. At this time, transmission of a print job to another image forming apparatus is restricted in accordance with user authentication based on a password or the like. The arrangements of the printer and the like in the second embodiment are the same as those in the first embodiment, and a description thereof will not be repeated.

For example, in a system including printer A and printer B, printer A stores, in a job spool area 302, a print job input from a data processing apparatus 101, and prints it without performing user authentication. Upon receiving a reprint instruction using printer B from the user for the job stored in the job spool area 302, printer A displays a user authentication information input request on an operation panel 112. If authentication information coincides with one input by the user, printer A transmits the target job as a print job to printer B. Printer B performs print processing similarly to a normal received job. At this time, printer B stores the print job input from printer A in the job spool area 302, and prints it without performing user authentication. Upon receiving a reprint instruction (by printer B) from the user for the job stored in the job spool area 302, printer B displays a user authentication information input request on the operation panel. If authentication information coincides with one input by the user, printer B prints the target job.

As described above, according to the second embodiment, upon accepting a reprint instruction, input of a password for authenticating a user is always requested regardless of an image forming apparatus which is to reprint. Only when the user authentication is successful, reprinting becomes possible. A user who uses a printer set in the reprint mode can print without reprinting his document or the like by another person without permission.

The user suffices to make a reprint user authentication setting on the printer driver only in the first printing. After that, even if a printer to print changes, the user can use the reprint function based on user authentication. Even a printer which is not in a complete user authentication environment by an authentication card or the like can provide the reprint function which ensures minimum security.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-205231 filed on Sep. 20, 2011, which is hereby incorporated by reference herein in its entirety.

What is claimed is:

1. An image forming apparatus capable of communicating with a host computer, comprising:
    a receiving unit configured to receive print data and attribute information of the print data from the host computer, wherein the attribute information includes reprint instructing information for instructing storage of the print data to be reprinted, a secure print password, and a reprint password;
    a printing unit configured to execute secure print processing of the print data, based on the secure print password;
    a storage unit configured to store the reprint password with the print data in a case where the attribute information includes the reprint instructing information;
    an accepting unit configured to accept an instruction for selecting a reprinting function of the image forming apparatus from a user;
    a requesting unit configured to request input of the reprint password for the user in a case where the reprinting function has been selected via the accepting unit; and
    a control unit configured to determine whether or not the reprint password input by the user corresponds to the reprint password stored in the storage unit, and to cause the printing unit to execute reprint processing of the print data stored in the storage unit if it is determined that the input reprint password corresponds to the stored reprint password,
    wherein the secure print password is capable of being switched so that the secure print password is the same as the reprint password or is different from the reprint password.

2. The apparatus according to claim 1, wherein the control unit deletes the print data after the printing unit prints the print data in a case where the attribute information does not include the reprint instructing information.

3. The apparatus according to claim 1, wherein the control unit prohibits the instruction for selecting the reprint function from being accepted, in a case where the image forming apparatus is not in a reprint mode.

4. The apparatus according to claim 1, further comprising a display unit for displaying a list of the print data to be reprinted in a case where the reprinting function has been selected via the accepting unit.

5. A method for controlling an image forming apparatus capable of communicating with a host computer, the method comprising:

receiving print data and attribute information of the print data from the host computer, wherein the attribute information includes reprint instructing information for instructing storage of the print data to be reprinted, a secure print password, and a reprint password;

executing secure print processing of the print data, based on the secure print password;

storing, in a storage unit, the reprint password with the print data in a case where the attribute information includes the reprint instructing information;

accepting an instruction for selecting a reprinting function of the image forming apparatus from a user;

requesting input of the reprint password for the user in a case where the reprinting function has been selected; and determining whether or not the reprint password input by the user corresponds to the reprint password stored in the storage unit, and causing a printing unit to execute reprint processing of the print data stored in the storage unit if it is determined that the input reprint password corresponds to the stored reprint password, wherein the secure print password is capable of being switched so that the secure print password is the same as the reprint password or is different from the reprint password.

6. A non-transitory computer-readable storage medium on which is stored code of a computer program for causing a computer to execute a method for controlling an image forming apparatus capable of communicating with a host computer, the method comprising:

receiving print data and attribute information of the print data from the host computer, wherein the attribute information includes reprint instructing information for instructing storage of the print data to be reprinted, a secure print password, and a reprint password;

executing secure print processing of the print data, based on the secure print password;

storing, in a storage unit, the reprint password with the print data in a case where the attribute information includes the reprint instructing information;

accepting an instruction for selecting a reprinting function of the image forming apparatus from a user;

requesting input of the reprint password for the user in a case where the reprinting function has been selected; and determining whether or not the reprint password input by the user corresponds to the reprint password stored in the storage unit, and causing a printing unit to execute reprint processing of the print data stored in the storage unit if it is determined that the input reprint password corresponds to the stored reprint password, wherein the secure print password is capable of being switched so that the secure print password is the same as the reprint password or is different from the reprint password.

* * * * *